United States Patent [19]

Kohyama et al.

[11] Patent Number: 4,546,172
[45] Date of Patent: Oct. 8, 1985

[54] PROCESS FOR PRODUCING POLYCARBONATE RESIN PARTICLES

[75] Inventors: Katsuhisa Kohyama; Akira Matsuno; Kenji Tsuruhara, all of Kyushu, Japan

[73] Assignee: Mitsubishi Chemical Industries Ltd., Tokyo, Japan

[21] Appl. No.: 568,422

[22] Filed: Jan. 5, 1984

[30] Foreign Application Priority Data

Jan. 20, 1983 [JP] Japan ................................ 58-7971
Nov. 25, 1983 [JP] Japan ............................. 58-221818

[51] Int. Cl.⁴ ............................................. C08G 63/64
[52] U.S. Cl. ..................................... 528/491; 528/501; 528/372; 528/502; 523/343
[58] Field of Search ................ 528/372, 491, 501; 523/343

[56] References Cited

U.S. PATENT DOCUMENTS

| | | | |
|---|---|---|---|
| 3,267,074 | 2/1962 | Wood | 528/491 |
| 3,294,741 | 12/1966 | Schnell et al. | 528/372 |
| 3,509,094 | 4/1970 | Gemassmer | 523/343 |
| 3,847,886 | 11/1974 | Blunt | 528/491 |
| 3,954,713 | 5/1976 | Schnoring et al. | 528/491 |
| 4,444,978 | 4/1984 | Dick et al. | 528/372 |
| 4,452,976 | 6/1984 | Kohyama et al. | 528/491 |

FOREIGN PATENT DOCUMENTS

2826196 12/1979 Fed. Rep. of Germany .
0066594 6/1977 Japan .

Primary Examiner—John Kight
Assistant Examiner—Garnette D. Draper
Attorney, Agent, or Firm—Oblon, Fisher, Spivak, McClelland & Maier

[57] ABSTRACT

A process for producing polycarbonate resin particles from a methylene chloride solution of a polycarbonate resin obtained by the polycondensation of a dihydroxydiaryl compound and phosgene, which comprises continuously supplying the methylene chloride solution of the polycarbonate resin to a particle-forming vessel, heating it while maintaining it in a suspended state in water to evaporate methylene chloride and to form an aqueous slurry containing polycarbonate resin particles, subjecting at least a part of the resulting aqueous slurry withdrawn from the particle-forming vessel and containing the polycarbonate resin particles to wet pulverization treatment and recycling at least a part of the treated polycarbonate resin particles to the particle-forming vessel.

14 Claims, 4 Drawing Figures

PROCESS FOR PRODUCING POLYCARBONATE RESIN PARTICLES

The present invention relates to a process for producing particles of a polycarbonate resin obtained by the polycondensation of a dihydroxydiaryl compound and phosgene. (Such a polycarbonate resin will be hereinafter referred to simply as a polycarbonate resin.) More particularly, it relates to a process for producing polycarbonate resin particles having a high bulk density and a uniform particle size, from a methylene chloride solution of the polycarbonate resin.

As a method for obtaining a solid polycarbonate resin from a methylene chloride solution of the polycarbonate resin, there has been proposed a process wherein methylene chloride is evaporated from the solution (e.g. Japanese Examined Pat. Publication No. 22497/1963), a process wherein the solution is mixed with a non-solvent such as toluene thereby to precipitate the polycarbonate resin (e.g. Japanese Examined Pat. Publication No. 31468/1971), or a process wherein the polymer solution is jetted from a nozzle into warm water whereby particles are formed in the warm water in a stirred state (e.g. Japanese Examined Pat. Publication No. 37424/1971).

The solid polycarbonate resin thereby obtained is then dried. In order to facilitate this drying operation, it is desired that the solid has a proper porosity. Further, in order to facilitate a further processing such as pelletizing by melt extrusion, it is desired that the solid particles have a high bulk density and a uniform particle size.

However, the solid polycarbonate resin obtained by simply evaporating methylene chloride from the above-mentioned methylene chloride solution of the polycarbonate resin, is not porous. Further, the solid polycarbonate resin is hardly pulverized, and in order to pulverize it, a strong motive power is required and yet the polycarbonate resin thereby obtained has a non-uniform particle size including fine particles.

On the other hand, the polycarbonate resin obtained by mixing the above-mentioned methylene chloride solution of the polycarbonate resin with a non-solvent for precipitation, is fine flakes having an extremely low bulk density.

In the above-mentioned process for forming particles by jetting the polymer solution from a nozzle into warm water, the bulk density of the particles obtained is as low as from 0.2 to 0.4 g/cm$^3$, and the slurry concentration is required to be low at a level of at most 5%. Thus, this process is not suitable as an industrial process for the production of polycarbonate particles.

The present inventors have conducted extensive researches with an aim to produce polycarbonate resin particles having satisfactory characteristics and, as a result, have found that when methylene chloride is evaporated from the methylene chloride solution of the polycarbonate resin by heating the solution in a suspended state in a particle-forming vessel in which an aqueous slurry subjected to wet pulverization treatment and containing polycarbonate resin particles is circulated, it is possible to produce polycarbonate resin particles having a bulk density of from 0.4 to 0.7 g/cm$^3$, a proper porosity and a uniform particle size, constantly for a long period of time. The present invention has been accomplished based on this discovery.

Namely, it is an object of the present invention to produce polycarbonate resin particles having satisfactory characteristics in an industrially advantageous manner.

This object has been attained by a process for producing polycarbonate resin particles from a methylene chloride solution of the polycarbonate resin, which comprises continuously supplying the methylene chloride solution of the polycarbonate resin to a particle-forming vessel, heating it while maintaining it in a suspended state in water to evaporate methylene chloride and to form polycarbonate resin particles, subjecting at least a part of the resulting aqueous slurry withdrawn from the particle-forming vessel and containing the polycarbonate resin particles to wet pulverization treatment and recycling the treated slurry to the particle-forming vessel.

Now, the present invention will be described in detail with reference to the preferred embodiments.

As the methylene chloride solution of the polycarbonate resin used in the present invention, there may be mentioned a solution of a polycarbonate resin obtained by a known process wherein a dihydroxydiaryl compound represented by the general formula:

where X is a divalent group represented by

—O—, —S—, —SO— or —SO$_2$, where R which may be the same or different is a hydrogen atom, a monovalent hydrocarbon group or a halogen atom and R' is a divalent hydrocarbon group, and the aromatic rings may be substituted by hydrogen atoms or monovalent hydrocarbon groups, is reacted with phosgene or a bischloroformate of a dihydroxydiaryl compound by interfacial polymerization or solution polymerization in the presence of methylene chloride and an acid-binding agent such as alkali metal hydroxide or pyridine, and the reaction mixture thereby obtained is washed with an aqueous washing solution to remove impurities.

As specific dihydroxydiaryl compounds of the formula I, there may be mentioned bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenyl methane, 2,2-bis(4-hydroxy-3-methylphenyl)propane, 1,1-bis(4-hydroxy-3-tert.butylphenyl)propane, 2,2-bis(4-hydroxy-3-bromophenyl)-propane, 2,2-bis(4-hydroxy-3,5-dibromophenyl)propane, 2,2-bis(4-hydroxy-3,5-dichlorophenyl)propane; bis(hydroxyaryl)cycloalkanes such as 1,1-bis(4-hydroxyphenyl)cyclopentane or 1,1-bis(hydroxyphenyl)-cyclohexane; dihydroxydiaryl ethers such as 4,4'-dihydroxydiphenyl ether or 4,4'-dihydroxy-3,3'-dimethyldiphenyl ether; dihydroxydiaryl sulfides such as 4,4'-dihydroxydiphenyl sulfide or 4,4'-dihydroxy-3,3'-dimethyldiphenyl sulfide; dihydroxydiaryl sulfoxides such as 4,4'-dihydroxydiphenyl sulfoxide or 4,4'-dihydroxy-3,3'-dimethyldiphenyl sulfoxide; or dihydroxydiaryl sulfones such as 4,4'-dihydroxydiphenyl sulfone or 4,4'-dihydroxy-3,3'-dimethyldiphenyl sulfone.

These compounds may be used alone or in combination as a mixture of two or more different kinds. Further, these compounds may be used in combination with other suitable compounds such as hydroquinone, resorcine or 4,4'-dihydroxydiphenyl.

The methylene chloride used as a solvent for the polymerization reaction, may contain not more than 10% by weight of other solvents such as chloroform, carbon tetrachloride, 1,2-dichloroethane, 1,1,2-trichloroethane, tetrachloroethane, or chlorobenzene. Such a solvent mixture does not adversely affect the process for the production of polycarbonate resin particles according to the present invention. Accordingly, it is unnecessary to separate the methylene chloride from other solvent, and the reaction mixture obtained by the polymerization may be used as it is for the process of the present invention.

The polymer concentration in the methylene chloride solution of the polycarbonate resin used in the present invention, is usually from 3 to 35% by weight, preferably from 5 to 25% by weight.

According to the present invention, the above-mentioned methylene chloride solution of the polycarbonate resin is continuously supplied to a particle-forming vessel in which an aqueous slurry from the wet pulverization step is circulated, and the evaporation of the methyl chloride is conducted while maintaining the solution in a suspended state.

Now, preferred embodiments of the present invention will be described with reference to the accompanying drawings.

Figure 1:
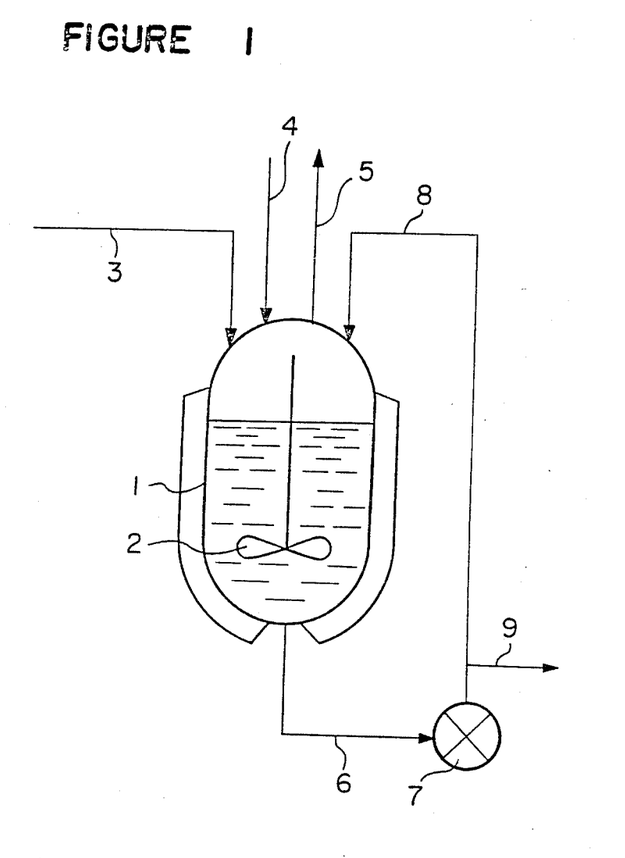
FIGS. 1 to 4 are diagrammatic views illustrating apparatus to be used for the operation of the process of the present invention.
Figure 2:
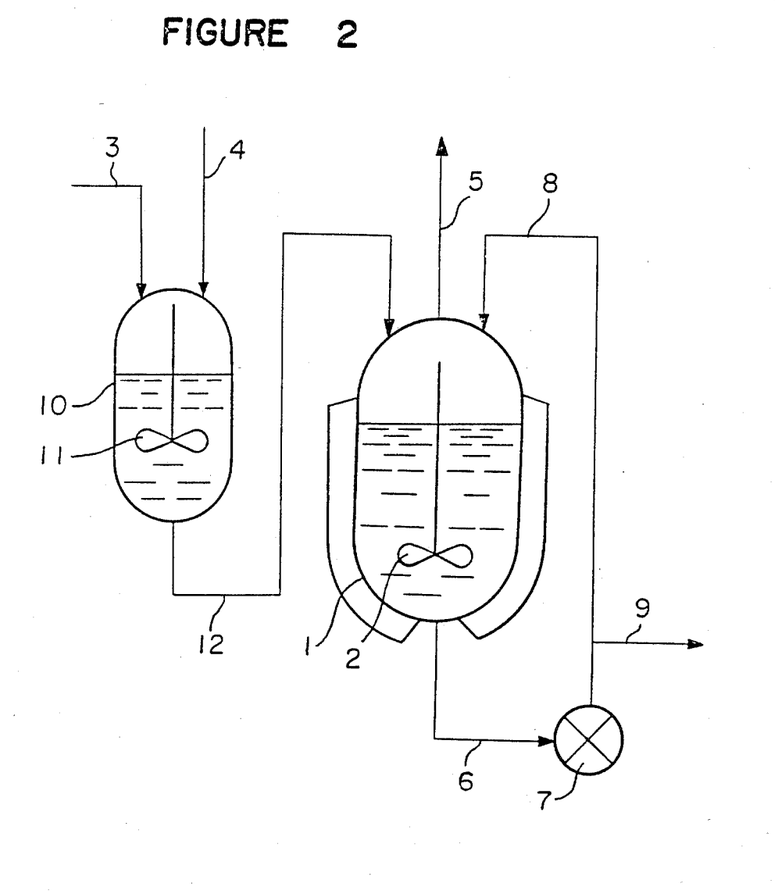
Figure 3:
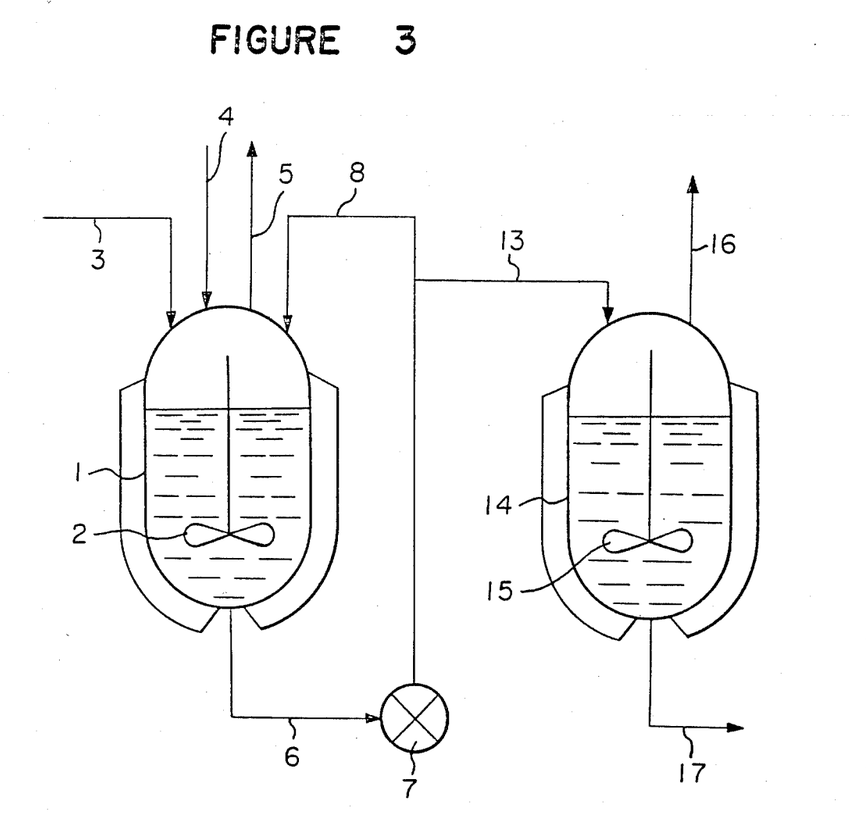
Figure 4:
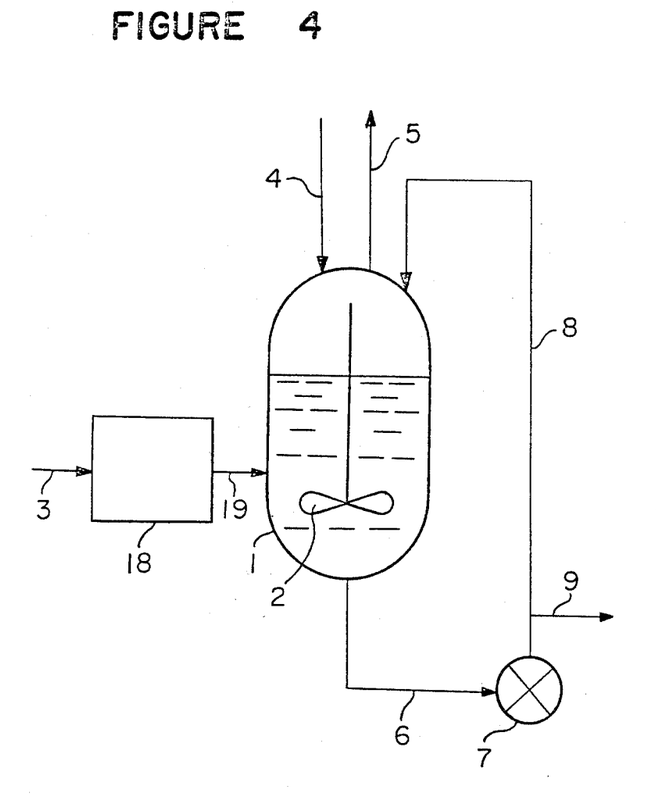

Referring to FIGS. 1 to 4, reference numeral 1 designates a particle-forming vessel, numeral 2 designates a stirrer, numeral 3 designates an inlet pipe for the polymer solution, numeral 4 designates an inlet pipe for the supplemental water, numeral 5 designates an outlet pipe for the evaporated methylene chloride, numeral 6 designates an outlet pipe for the aqueous slurry containing polymer particles, numeral 7 designates a wet pulverizer, numeral 8 designates an inlet pipe for the recycling aqueous slurry and numeral 9 designates a discharge pipe for the aqueous slurry containing product polymer particles. In FIG. 2, reference numeral 10 designates a stirrer and numeral 12 designates an outlet pipe for the oil-in-water type suspension mixture. In FIG. 3, reference numeral 13 designates an inlet pipe for the aqueous slurry, numeral 14 designates an evaporation vessel, numeral 15 designates a stirrer, numeral 16 designates an outlet pipe for methylene chloride, and numeral 17 designates a discharge pipe for the aqueous slurry containing product polycarbonate resin particles. In FIG. 4, reference numeral 18 designates a heat-exchanger, and numeral 19 designates an inlet pipe for the preheated polymer solution.

As the particle-forming vessel 1, there may be used any apparatus which is provided with a stirring means capable of maintaining the methylene chloride solution of the polycarbonate resin in a suspended state in water. A usual agitation vessel is adequate for this purpose.

To this particle-forming vessel 1, at least a part of the aqueous slurry containing polymer particles which has been withdrawn via the outlet pipe 6 and subjected to pulverization treatment by means of the wet pulverizer 7, is recycled via the inlet pipe 8 for the recycling aqueous slurry, and at the same time, supplemental water and the methylene chloride solution of the polycarbonate resin are continuously supplied via the supplemental water inlet pipe 4 and the polymer solution inlet pipe 3, respectively.

The methylene chloride solution of the polycarbonate resin may be supplied at a temperature as it is discharged from the step of the preparation of the polycarbonate, e.g. at room temperature. However, it is preferred to preheat it to a temperature higher than the boiling point of methylene chloride, e.g. from 37° to 150° C., more preferably from 40° to 120° C., before supplying it to the particle-forming vessel.

For the preheating, there may be employed a common heating means such as a tubular-type heat-exchanger or a jacketted agitation vessel. Alternatively, it is also possible to dispose the inlet pipe for the polymer solution in the particle-forming vessel so that the methylene chloride solution is preheated by the aqueous slurry in the particle-forming vessel.

If the polymer solution is so preheated before it is supplied to the particle-forming vessel, it is thereby possible to avoid the formation of large ball-shaped aggregates in the vessel, whereby it is possible to avoid clogging of the discharge pipe and thus to ensure a proper continuous operation for a long period of time. Further, it is thereby possible to ensure that the resulting polymer particles have a uniform particle size. Furthermore, the viscosity of the polymer solution is lowered by the preheating and accordingly, even when the polymer solution is supplied to the particle-forming vessel in a high concentration, the dispersibility of the polymer solution and the flowability of the slurry in the vessel will be thereby improved, whereby the formation of aggregates in the vessel or at the inner surface of the vessel can be avoided, and it is possible to ensure a proper operation for a long period of time.

As illustrated in FIG. 1, the supplemental water is introduced into the particle-forming vessel 1 via the supplemental water inlet pipe 4. However, the introduction of the supplemental water is not limited to this specific embodiment. For instance, the supplemental water may be introduced together with the above-mentioned recycling aqueous slurry or together with the methylene chloride solution of the polycarbonate resin.

It is preferred that as shown in FIG. 2, a separate preconditioning vessel 10 is provided before the particle-forming vessel 1, and the methylene chloride solution of the polycarbonate resin and the supplemental water are introduced into this preconditioning vessel 10 to form an oil-in-water type suspension mixture, and the suspension mixture is then supplied via the outlet pipe 12 to the particle-forming vessel 1, whereby a stable operation can readily be made. This embodiment is particularly preferred when a copolymer-type polycarbonate resin obtained by the polycondensation of two or more dihydroxydiaryl compounds and phosgene, e.g. a copolymer polycarbonate resin obtained by the polycondensation of 2,2-bis(4-hydroxyphenyl)propane, 2,2-bis(4-hydroxy-3,5-dibromophenyl)propane and phosgene, is to be treated.

It is preferred to provide a preconditioning vessel before the particle-forming vessel as illustrated in FIG. 2, also in a case where particles of a resin mixture are to be prepared by simultaneously using two or more polycarbonate resins having different natures (e.g. a usual polycarbonate resin and a halogenated polycarbonate), or a polycarbonate resin and an aromatic polyester polycarbonate.

The ratio of the methylene chloride solution to water to form the oil-in-water type suspension mixture varies depending upon the type of the polycarbonate resin, its molecular weight or its concentration in the methylene chloride solution. However, the volume ratio of the methylene chloride solution to water is preferably selected within a range of 1 : 0.1 - 4, more preferably 1 : 0.2 - 3.

Like the particle-forming vessel 1, the preconditioning vessel 10 may be of any type so long as it is capable of providing adequate stirring. A usual agitation vessel is adequate for this purpose.

In this preconditioning vessel 10, methylene chloride may be evaporated to such an extent that polycarbonate resin particles do not form. Especially when polymer concentration in the methylene chloride solution of the polycarbonate resin to be introduced in the preconditioning vessel 10 is low, it is preferred to evaporate methylene chloride in the preconditioning vessel 10 to raise the polymer concentration to a level of e.g. from 5 to 25% by weight so that polycarbonate resin particles having a uniform particle size can be constantly formed substantially in the particle-forming vessel 1.

The temperature for the evaporation of the methylene chloride in the particle-forming vessel 1 and the preconditioning vessel 10 may be selected within a range of from the azeotropic point of the methylene chloride and water to the boiling point of water. However, it is unnecessary to evaporate water. Accordingly, the temperature is selected within a range of from 37° to 60° C., usually from 37° to 55° C. and preferably from 40° to 50° C. If the temperature of the particle-forming vessel 1 is too low, there will be disadvantages such that the evaporation of the methylene chloride becomes slow and the particle-forming efficiency will be inferior, or aggregates of the polycarbonate resin will be likely to form in the vessel. On the other hand, if the temperature is too high, the bulk density of the resulting polycarbonate resin particles tends to be low. For these reasons, it is preferred that the temperature is maintained within a range of from 40° to 55° C., more preferably from 40° to 50° C.

Thus, as the methylene chloride is evaporated, there will be formed in the particle-forming vessel 1 polycarbonate resin particles as a combination of polycarbonate resin particles recycled after the wet pulverization treatment and the solid polycarbonate resin formed from the supplied methylene chloride solution of polycarbonate resin. The polycarbonate resin particles thus formed are continuously withdrawn via the outlet pipe 6 in the form of an aqueous slurry.

In view of the efficiency of the stirring and the handling of the aqueous slurry, the amount of the polycarbonate resin particles in the particle-forming vessel 1 is advantageously within a range of from 5 to 50% by weight, preferably from 10 to 45% by weight more preferably from 15 to 40% by weight, relative to the aqueous slurry in the particle-forming vessel 1. The amount of the polycarbonate resin particles is preferably maintained at a constant level within the above-mentioned range by adjusting the amount of the methylene chloride solution of the polycarbonate resin supplied to the particle-forming vessel 1, the amount of the supplemental water and the amount of the aqueous slurry containing the polycarbonate resin particles withdrawn from the particle-forming vessel.

In the present invention, at least a part of the aqueous slurry withdrawn via the outlet pipe 6 is treated by wet pulverization by means of a wet pulverizer 7 and then recycled to the particle-forming vessel 1, and at the same time product polycarbonate resin particles are discharged.

As the wet pulverizer 7 to be used for the wet pulverization treatment, any type may be employed so long as it is capable of pulverizing the solid in the slurry. However, preferred is a pulverizer which is not only capable of pulverizing the solid but also capable of transferring the aqueous slurry. For instance, the pulverizer is preferably of the type wherein stirring vanes rotate at a high speed or of the type wherein bladed stirring vanes rotate at a high speed. As a commercial pulverizer of the former type, there may be mentioned Pipe Line Homo Mixer (trademark) or Homo Mic Line Mill (trademark) manufactured by Tokushu Kika Kogyo K.K., and as a commercial pulverizer of the latter type, there may be mentioned Disintegrator (trademark) manufactured by Komatsu Zenoa K.K.

The pulverization by the wet pulverization treatment should be preferably conducted to such an extent that the polycarbonate resin particles in the above-mentioned aqueous slurry become to have a particle size of from 0.1 to 4 mm, preferably from 0.2 to 2 mm.

The aqueous slurry thus treated by the wet pulverization treatment is recycled to the particle-forming vessel 1 in an amount of from 50 to 99.5% by weight, preferably from 70 to 98% by weight, based on the total aqueous slurry withdrawn from the particle-forming vessel 1. If the amount is too small, the particle size of the polycarbonate resin particles formed in the particle-forming vessel 1 gradually increases and tends to be non-uniform, thus leading to disadvantages such that it becomes difficult to obtain satisfactory products or that continuous operation becomes to be impossible. On the other hand, if the amount is too much, the yield of the products becomes less although there is no adverse effect to the operation and the quality of the products.

In FIGS. 1 and 2, the aqueous slurry for obtaining polycarbonate resin particles as a final product is withdrawn via the discharge pipe 9 from the aqueous slurry after the wet pulverization treatment. However, it may be withdrawn from the particle-forming vessel 1 or from the outlet pipe 6.

In the present invention, it is also possible to employ an evaporation vessel as shown at 14 in FIG. 3, into which the aqueous slurry withdrawn from the particle-forming vessel or the aqueous slurry from the wet pulverization treatment is introduced and treated at a temperature higher than the temperature of the above-mentioned particle-forming vessel, whereby the methylene chloride is further evaporated to reduce the methylene chloride content in the product polymer, and it is possible to obtain polymer particles having a higher bulk density without bringing about a trouble of fusion of the particles.

Like the particle-forming vessel 1, the evaporation vessel 14 may be of any type so long as it is capable of providing adequate stirring. A usual agitation vessel is adequate for this purpose.

The aqueous slurry from the particle-forming step is introduced via the inlet pipe 13 for the aqueous slurry. FIG. 3 illustrates a case where the aqueous slurry from the wet pulverization step is introduced into the evaporation vessel 14. However, the aqueous slurry may be introduced directly from the particle-forming vessel 1 or from the outlet pipe 6. In the evaporation vessel, the treatment is conducted under stirring at a temperature higher than the temperature of the particle-forming vessel within a range of from 60° to 100° C., preferably from 75° to 98° C. The evaporated methylene chloride is withdrawn from the methylene chloride outlet pipe 16 and the aqueous slurry containing the product polycarbonate resin particles is withdrawn from the discharge pipe 17.

In order to obtain the polycarbonate resin particles as the final product from the aqueous slurry obtained by the process as described with reference to FIG. 1, 2 or 3, the particles are separated by a suitable mean such as decantation, filtration or centrifugation and then dried.

According to the process of the present invention, it is possible to produce polycarbonate resin particles having a high bulk density and a uniform particle size in a simple operation constantly for a long period of time. Thus, the process is industrially extremely advantageous.

Now, the present invention will be described in further detail with reference to Examples. However, it should be understood that the present invention is not restricted to these specific Examples.

In the Examples, "%" means "% by weight".

The particle size is represented by a 50% on-sieve weight integration (median diameter: Dp-50), and the particle size distribution is represented by the value n in the following Rosin-Rammler distribution equation disclosed on page 973 in "Chemical Engineering Handbook, 4th edition" published on October 25, 1978 by Maruzen Co., Ltd.

$$R = 100 \exp(-bDp^n)$$

where R is an on-sieve amount (% by weight), Dp is a particle diameter (mm), and b is a constant.

EXAMPLE 1

With use of the apparatus as illustrated in FIG. 1, the production of particles of a polycarbonate resin prepared from 2,2-bis(4-hydroxyphenyl)propane (i.e. bisphenol A) and phosgene by interfacial polymerization and having $\eta sp/C$ of 0.52, was carried out.

As the particle-forming vessel 1, a 20 l (an internal diameter of 26 cm) agitation vessel provided with a jacket and equipped with a stirrer 2 having four turbine vanes having a vane length of 16 cm and vane width of 3 cm, was used.

As the recycling aqueous slurry, an aqueous slurry obtained by subjecting an aqueous slurry withdrawn from the aqueous slurry outlet pipe 6 and containing 15% of polycarbonate resin particles (i.e. 15% by weight, relative to water, of the methylene chloride-containing resin particles, which corresponds to 9% by weight, relative to the aqueous slurry, of the pure resin particles) to pulverization treatment by means of a wet pulverizer 7 (Pipe Line Homo Mixer (trademark) manufactured by Tokushu Kika Kogyo K.K.), was used. While recycling this aqueous slurry via the recycling aqueous slurry inlet pipe 8 at a rate of 900 l/hr, and supplying 5 l/hr of the above-mentioned methylene chloride solution containing 15% of polycarbonate resin via the polymer solution inlet pipe 3 and 10 l/hr of water via the supplemental water inlet pipe 4, the evaporation of the methylene chloride was conducted at an internal temperature of 45° C. under stirring at a stirring vane rotational speed of 240 rpm to form polycarbonate resin particles.

From the outlet side of the wet pulverizer 7, 11.4 l/hr of the aqueous slurry was withdrawn via the product aqueous slurry discharge pipe 9, and the content of the particle-forming vessel 1 was maintained to be 17 l.

The aqueous slurry thus withdrawn was filtered to separate the polycarbonate resin particles, and the particles were vacuum-dried at 140° C. for 6 hours.

The polycarbonate resin particles thereby obtained had a bulk density of 0.53 g/cm$^3$, an average particle size (Dp-50) of 1.50 mm and a particle size distribution (value n) of 6.5.

EXAMPLE 2

With use of the same apparatus as used in Example 1, polycarbonate resin particles were continuously produced in the same manner as in Example 1 except that the methylene chloride solution containing 20% of the polycarbonate resin was supplied at a rate of 3.9 l/hr.

The polycarbonate resin particles thereby obtained had a bulk density of 0.48 g/cm$^3$, an average particle size (Dp-50) of 1.46 mm and a size distribution (value n) of 5.9.

EXAMPLE 3

With use of the apparatus as illustrated in FIG. 2, the production of particles of the same polycarbonate resin as used in Example 1 was carried out.

As the particle-forming vessel 1, the same apparatus as used in Example 1 was used. As the preconditioning vessel 10, a 1.2 l agitation vessel was used.

Into the preconditioning vessel 10, 6 l/hr of a methylene chloride solution containing 15% of the above-mentioned polycarbonate resin and 6 l/hr of water were continuously introduced via the polymer solution inlet pipe 3 and the supplemental water inlet pipe 4, respectively, and stirred to form an oil-in-water type suspension mixture, and this mixture was withdrawn via the outlet pipe 12 and supplied to the particle-forming vessel 1.

Into the particle-forming vessel 1, 5.3 l/hr of water was further introduced, and the rest of the operation was carried out in the same manner as in Example 1.

The polycarbonate resin particles thereby obtained had a bulk density of 0.51 g/cm$^3$, an average particle size (Dp-50) of 1.58 mm and a size distribution (value n) of 5.5

EXAMPLE 4

With use of the apparatus as shown in FIG. 3, the production of particles of the same polycarbonate resin as used in Example 1 was carried out.

The operation of the particle-forming vessel 1 was performed in the same manner as in Example 1. As the evaporation vessel 14, an agitation vessel having the same structure as the particle-forming vessel 1 was used, and 11.4 l/hr of the aqueous slurry from the wet pulverization treatment was introduced from the aqueous slurry inlet pipe 13. The internal temperature was maintained at 85° C., and the evaporated methylene chloride was discharged from the methylene chloride outlet pipe 16. The product polycarbonate resin-containing aqueous slurry was withdrawn from the discharge pipe 17 so that the content of the vessel was maintained at a level of 17 l. Polycarbonate resin particles were separated from the aqueous slurry by filtration and vacuum-dried at 140° C. for 6 hours.

The polycarbonate resin particles thereby obtained had a bulk density of 0.55 g/cm$^3$, an average particle size (Dp-50) of 1.49 mm and a size distribution (value n) of 6.3.

EXAMPLE 5

With use of the apparatus as illustrated in FIG. 1, the production of particles of the same polycarbonate resin as used in Example 1 was carried out.

As the particle-forming vessel 1, a 600 l (an internal diameter of 94 cm) agitation vessel provided with a jacket and equipped with a stirrer 2 having four turbine vanes having a vane length of 52 cm and a vane width of 6 cm, was used.

As the recycling aqueous slurry, an aqueous slurry obtained by subjecting an aqueous slurry withdrawn from the aqueous slurry outlet pipe 6 and containing 15% of polycarbonate resin particles to pulverization treatment by means of a wet pulverizer 7 (Komatsu Throughzer Disintegrator (trademark) manufactured by Komatsu Zenoa K.K.), was used and while recycling this aqueous slurry via the recycling aqueous slurry inlet pipe 8 at a rate of 10 m$^3$/hr, 160 l/hr of the above-mentioned methylene chloride solution containing 15% of polycarbonate resin was introduced via the polymer solution inlet pipe 3 and 280 l/hr of water of 40° C. was introduced via the supplemental water inlet pipe 4, and the evaporation of the methylene chloride was conducted at an internal temperature of 45° C. under stirring at a stirring vane rotational speed of 100 rpm to form polycarbonate resin particles.

From the outlet side of the wet pulverizer 7, 320 l/hr of the aqueous slurry was withdrawn via the product aqueous slurry discharge pipe 9, and the content of the particle-forming vessel 1 was maintained to be 600 l.

The aqueous slurry thus withdrawn was filtered to separate the polycarbonate resin particles, and the particles were vacuum-dried at 140° C. for 6 hours.

The polycarbonate resin particles thereby obtained had a bulk density of 0.59 g/cm$^3$, an average particle size (Dp-50) of 0.96 mm and a size distribution (value n) of 4.6.

EXAMPLE 6

With use of the apparatus as illustrated in FIG. 4, the production of particles of a polycarbonate resin prepared from 2,2-bis(4-hydroxyphenyl)propane and phosgene by interfacial polymerization and having $\eta$ sp/C of 0.52, was carried out.

As the particle-forming vessel 1, a 600 l (an internal diameter of 94 cm) agitation vessel provided with a jacket and equipped with a stirrer 2 having four turbine vanes having a vane length of 52 cm and vane width of 6 cm, was used.

As the recycling aqueous slurry, an aqueous slurry obtained by subjecting an aqueous slurry withdrawn from the aqueous slurry outlet pipe 6 at a rate of 10 m$^3$/hr and containing 30% of polycarbonate resin particles (i.e. the content of pure resin particles relative to the aqueous slurry, as will be applied also hereinafter) to pulverization treatment by means of a wet pulverizer 7 (Komatsu Throughzer Disintegrator (trademark) manufactured by Komatsu Zenoa K.K.), was used. A part of the aqueous slurry was withdrawn as the product from the discharge pipe 9, and the rest (97.5%) was recycled to the particle-forming vessel from the inlet pipe 8 for the recycling aqueous slurry.

From the inlet pipe 3 for the polycarbonate solution, 450 l/hr of a methylene chloride solution containing 13% of the above-mentioned polycarbonate resin was introduced to the heat-exchanger 18, preheated to 120° C. and then supplied to the particle-forming vessel from the preheated resin solution inlet pipe 19 having an inner diameter of 10 mm. At the same time, 150 l/hr or water of 70° C. was supplied from the supplemental water inlet pipe 4. The evaporation of methylene chloride was conducted at an internal temperature of 44° C. and at a rotational speed of the stirrer of 100 rpm, whereby the polycarbonate resin particles were formed.

From the outlet side of the wet pulverizer 7, 250 l/hr of the aqueous slurry was withdrawn via the discharge pipe 9 for the aqueous slurry containing the product resin particles, and the rest of the aqueous slurry was recycled to the particle-forming vessel 1 to maintain the content of the vessel 1 at a level of 600 l.

The withdrawn aqueous slurry was subjected to centrifugal separation, and the polycarbonate resin particles thereby separated were dried at 140° C. for 6 hours.

The operation was continued in this manner for 5 days, whereby no formation of coarse aggregates or blocks was observed. The polycarbonate resin particles thereby obtained, had a bulk density of 0.58 g/cm$^3$, an average particle size (Dp-50) of 1.06 mm and a particle size distribution (value n) of 4.6.

EXAMPLE 7

The operation was conducted in the same manner as in Example 6 except that the preheating temperature of the methylene chloride solution of the polycarbonate resin was changed to 70° C.

The operation was continued for 5 days, whereby no formation of coarse aggregates was observed, and the operation was carried out smoothly in a stabilized condition.

The polycarbonate resin particles thereby obtained, had a bulk density of 0.60 g/cm$^3$, an average particle size (Dp-50) of 1.12 mm and a particle size distribution (value n) of 4.5.

EXAMPLE 8

The operation was conducted in the same manner as in Example 6 except that the preheating temperature of the methylene chloride solution of the polycarbonate resin was changed to 40° C.

The operation was continued for 5 days, whereby no formation of coarse aggregates was observed, and the operation was carried out smoothly in a stabilized condition.

The polycarbonate resin particles thereby obtained, had a bulk density of 0.62 g/cm$^3$, an average particle size (Dp-50) of 1.04 mm and a particle size distribution (value n) of 4.4.

EXAMPLE 9

The same apparatus and polycarbonate resin as used in Example 6 were employed.

As the recycling aqueous slurry, an aqueous slurry obtained by subjecting an aqueous slurry withdrawn from the aqueous slurry outlet pipe 6 and containing 30% of polycarbonate resin particles to pulverization treatment by means of a wet pulverizer 7 (Komatsu Throughzer Disintegrator (trademark) manufactured by Komatsu Zenoa K.K.). A part of the aqueous slurry was withdrawn as the product from the discharge pipe 9, and the rest (97.0%) was recycled to the particle-forming vessel from the inlet pipe 8 for the recycling aqueous slurry.

From the inlet pipe 3 for the polycarbonate solution, 400 l/hr of a methylene chloride solution containing 20% of the above-mentioned polycarbonate resin was introduced to the heat-exchanger 18, preheated to 80° C. and then supplied to the particle-forming vessel from the preheated resin solution inlet pipe 19 having an inner diameter of 10 mm. At the same time, 180 l/hr of water of 70° C. was supplied from the supplemental water inlet pipe 4. The evaporation of methylene chloride was conducted at an internal temperature of 44° C. and at a rotational speed of the stirrer of 100 rpm, whereby the polycarbonate resin particles were formed.

From the outlet side of the wet pulverizer 7, 310 l/hr of the aqueous slurry was withdrawn via the discharge pipe 9 for the aqueous slurry containing the product resin particles, and the rest of the aqueous slurry was recycled to the particle-forming vessel 1 to maintain the content of the vessel 1 at a level of 600 l.

The withdrawn aqueous slurry was subjected to centrifugal separation, and the polycarbonate resin particles thereby separated were dried at 140° C. for 6 hours.

The operation was continued in this manner for 5 days, whereby no formation of coarse aggregates or blocks was observed. The polycarbonate resin particles thereby obtained, had a bulk density of 0.62 g/cm$^3$, an average particle size (Dp-50) of 1.10 mm and a particle size distribution (value n) of 4.6.

EXAMPLE 10

With use of the same apparatus as used in Example 6, the production of particles of a prepared from 2,2-bis(4-hydroxyphenyl)propane and phosphine by interfacial polymerization and having ηsp/C of 0.64 dl/g, was conducted.

As the recycling aqueous slurry, an aqueous slurry obtained by subjecting an aqueous slurry withdrawn from the aqueous slurry outlet pipe 6 at a rate of 10 m$^3$/hr and containing 30% of polycarbonate resin particles to pulverization treatment by means of a wet pulverizer 7 (Komatsu Throughzer Disintegrator (trademark) manufactured by Komatsu Zenoa K.K.), was used. A part of the aqueous slurry was withdrawn as the product from the discharge pipe 9, and the rest (97.6%) was recycled to the particle-forming vessel from the inlet pipe 8 for the recycling aqueous slurry.

From the inlet pipe 3 for the polycarbonate solution, 390 l/hr of a methylene chloride solution containing 15% of the above-mentioned polycarbonate resin was introduced to the heat-exchanger 18, preheated to 80° C. and then supplied to the particle-forming vessel from the preheated resin solution inlet pipe 19 having an inner diameter of 10 mm. At the same time, 150 l/hr of water of 70° C. was supplied from the supplemental water inlet pipe 4. The evaporation of methylene chloride was conducted at an internal temperature of 43° C. and at a rotational speed of the stirrer of 100 rpm, whereby the polycarbonate resin particles were formed.

From the outlet side of the wet pulverizer 7, 250 l/hr of the aqueous slurry was withdrawn via the discharge pipe 9 for the aqueous slurry containing the product resin particles, and the rest of the aqueous slurry was recycled to the particle-forming vessel 1 to maintain the content of the vessel 1 at a level of 600 l.

The withdrawn aqueous slurry was subjected to centrifugal separation, and the polycarbonate resin particles thereby separated were dried at 140° C. for 6 hours.

The operation was continued in this manner for 5 days, whereby no formation of coarse aggregates or blocks was observed. The polycarbonate resin particles thereby obtained, had a bulk density of 0.57 g/cm$^3$, an average particle size (Dp-50) of 1.24 mm and a particle size distribution (value n) of 4.3.

EXAMPLE 11

The polycarbonate resin particles were continuously produced under the same conditions by using the same apparatus as in Example 1 except that a methylene chloride solution containing 12% of the polycarbonate resin was introduced from the inlet pipe 3 at a rate of 15 l/hr, the resin particle content in the aqueous slurry was changed to 18%, and the discharge rate of te aqueous slurry from the discharge pipe 9 for the product aqueous slurry was changed to 13 l/hr.

The polycarbonate resin particles thereby obtained, had a bulk density of 0.56 g/cm$^3$, an average particle size (Dp-50) of 1.62 mm and a particle size distribution (value n) of 6.2.

EXAMPLES 12 to 13

With use of the same apparatus as used in Example 5, polycarbonate resin particles were continuously produced under the conditions as identified in Table 1.

The polycarbonate resin particles thereby obtained, had the bulk densities, average particle sizes and particle size distributions as shown in Table 1.

TABLE 1

| | Example 12 | Example 13 |
|---|---|---|
| Content of resin particles in aqueous slurry (%) | 30 | 32 |
| Recycling rate of aqueous slurry (m$^3$/hr) | 10 | 15 |
| Methylene chloride solution of polycarbonate | | |
| Concentration (%) | 12 | 20 |
| Supply rate (l/hr) | 500 | 350 |
| Supply rate of supplemental water (l/hr) | 160 | 170 |
| Temperature of particle-forming vessel (°C.) | 45 | 45 |
| Discharge rate of product aqueous slurry (l/hr) | 260 | 290 |
| Bulk density (g/cm$^3$) | 0.61 | 0.60 |
| Average particle size (Dp-50) | 1.23 | 0.98 |
| Particle size distribution (value n) | 4.5 | 4.2 |

COMPARATIVE EXAMPLE 1

With use of the same particle-forming vessel 1 as used in Example 1, 10 l of water was fed and heated to 60° C., and while supplying 6 l/hr of a methylene chloride solution containing 20% of the polycarbonate resin from the polymer solution inlet pipe 3 and 50 l/hr of water from the supplemental water inlet pipe 4, the evaporation of the methylene chloride was conducted at an internal temperature of 60° C.

In 15 minutes from the start of the operation, the precipitated polycarbonate deposited and grew on the stirring vanes, whereby resin particles were not obtained, and the operation became no longer possible as the stirring vanes stopped rotating.

COMPARATIVE EXAMPLE 2

With use of the same particle-forming vessel 1 as used in Example 5, the production of particles of the same polycarbonate resin as used in Example 1 was carried out without recycling the aqueous slurry.

Into the particle-forming vessel 1, 60 l/hr of a methylene chloride solution containing 11% of the above-mentioned polycarbonate resin and 70 l/hr of water were continuously supplied and while maintaining the internal temperature at 45° C., methylene chloride was evaporated to form polycarbonate resin particles.

From the bottom of the particle-forming vessel, 80 l/hr of the aqueous slurry containing the polycarbonate resin particles was withdrawn to maintain the aqueous slurry in the particle-forming vessel at a level of 600 l.

After 1 hour from the initiation of the operation, it became impossible to withdraw the aqueous solution, and the operation became no longer possible. The polycarbonate particles obtained by that time had a bulk density of 0.30 g/cm$^3$, an average particle size (Dp-50) of 3.8 mm and a particle size distribution (value n) of 1.5.

COMPARATIVE EXAMPLE 3

The production of particles of the same polycarbonate resin as used in Example 1 was carried out in the same manner as in Example 1 except that instead of the wet pulverizer 7 in the apparatus illustrated in FIG. 1, a diaphragm pump (Aired Pump (trademark) YD-20 Model manufactured by Iwaki K.K.) was used, and the aqueous slurry withdrawn from the aqueous slurry outlet pipe 6 was recycled without the wet pulverization treatment.

Polycarbonate resin particles obtained by filtration and drying, from the product aqueous slurry obtained after 30 minutes from the initiation of the operation, were grown or aggregated particles having a non-uniform particle size of from 1 to 5 mm. Thereafter, the particles accumulated at the valve portion of the diaphragm pump and closed the valve portion, and no further operation became possible.

EXAMPLE 14

With use of the same apparatus as used in Example 5, polycarbonate resin particles were prepared under the following conditions.

While recycling an aqueous slurry containing 15% of the polycarbonate resin particles at a rate of 3.3 m$^3$/hr from the inlet pipe 8 for the recycling aqueous slurry, and supplying 300 l/hr of a methylene chloride solution containing 15% of the polycarbonate resin from the polymer solution inlet pipe 3 and 200 l/hr of water of 40° C. from the supplemental water inlet pipe 4, the evaporation of the methylene chloride was conducted at an internal temperature of 45° C. and at a rotational speed of the stirrer of 100 rpm, whereby the polycarbonate resin particles were formed.

From the outlet side of the wet pulverizer 7, 280 l/hr of the aqueous slurry was withdrawn via the discharge pipe 9 for the product aqueous slurry so as to maintain the aqueous slurry in the particle-forming vessel 1 at a level of 600 l.

The withdrawn aqueous slurry was filtered to separate the polycarbonate resin particles, which were then dried at 140° C. for 6 hours. The polycarbonate resin particles thereby obtained, had a bulk density of 0.59 g/cm$^3$, an average particle size (Dp-50) of 1.69 mm and a particle size distribution (value n) of 4.8.

EXAMPLE 15

With use of the same apparatus as used in Example 5, polycarbonate resin particles were prepared under the following conditions.

While recycling an aqueous slurry containing 12% of the polycarbonate resin particles at a rate of 2.0 m$^3$/hr from the inlet pipe 8 for the recycling aqueous slurry, and supplying 300 l/hr of a methylene chloride solution containing 15% of the polycarbonate resin from the polymer solution inlet pipe 3 and 400 l/hr of water of 40° C. from the supplemental water inlet pipe 4, the evaporation of the methylene chloride was conducted at an internal temperature of 45° C. and at a rotational speed of the stirrer of 100 rpm, whereby the polycarbonate resin particles were formed.

From the outlet side of the wet pulverizer 7, 480 l/hr of the aqueous slurry was withdrawn via the discharge pipe 9 for the product aqueous slurry so as to maintain the aqueous slurry in the particle-forming vessel 1 at a level of 600 l.

The withdrawn aqueous slurry was filtered to separate the polycarbonate resin particles, which were then dried at 140° C. for 6 hours. The polycarbonate resin particles thereby obtained, had a bulk density of 0.62 g/cm$^3$, an average particle size (Dp-50) of 2.68 mm and a particle size distribution (value n) of 4.4.

EXAMPLE 16

With use of the same apparatus as used in Example 5, polycarbonate resin particles were prepared under the following conditions.

While recycling an aqueous slurry containing 10% of the polycarbonate resin particles at a rate of 0.9 m$^3$/hr from the inlet pipe 8 for the recycling aqueous slurry, and supplying 300 l/hr of a methylene chloride solution containing 15% of the polycarbonate resin from the polymer solution inlet pipe 3 and 510 l/hr of water of 40° C. from the supplemental water inlet pipe 4, the evaporation of the methylene chloride was conducted at an internal temperature of 45° C. and at a rotational speed of the stirrer of 100 rpm, whereby the polycarbonate resin particles were formed.

From the outlet side of the wet pulverizer 7, 590 l/hr of the aqueous slurry was withdrawn via the discharge pipe 9 for the product aqueous slurry so as to maintain the aqueous slurry in the particle-forming vessel 1 at a level of 600 l.

The withdrawn aqueous slurry was filtered to separate the polycarbonate resin particles, which were then dried at 140° C. for 6 hours. The polycarbonate resin particles thereby obtained, had a bulk density of 0.58 g/cm$^3$, an average particle size (Dp-50) of 3.86 mm and a particle size distribution (value n) of 5.1.

I claim:

1. A process for producing polycarbonate resin particles from a methylene chloride solution of a polycarbonate resin obtained by the polycondensation of a dihydroxydiaryl compound and phosgene, which comprises:

continuously supplying said methylene chloride solution of polycarbonate resin into a particle-forming vessel further containing an agitated aqueous medium consisting of a suspension of polycarbonate resin particles;

heating the agitated mixture while maintaining the same in a suspended state to effect evaporation of methylene chloride, thereby resulting in the formation of polycarbonate resin particles;

subjecting at least a portion of the resulting aqueous slurry withdrawn from the particle-forming vessel which contains the polycarbonate resin particles, to a wet pulverization treatment; and recycling at least a portion of the pulverized polycarbonate resin particles to the particle-forming vessel.

2. The process according to claim 1, wherein the particle-forming vessel is maintained at a temperature of from 37° to 60° C. for the evaporation of methylene chloride.

3. The process according to claim 1, wherein the methylene chloride solution of the polycarbonate resin is preheated to a temperature of from 37° to 150° C. before it is supplied to the particle-forming vessel.

4. The process according to claim 1, wherein the amount of the polycarbonate resin particles in the aqueous slurry in the particle-forming vessel is from 5 to 50% by weight relative to the aqueous slurry.

5. The process according to claim 1, wherein the amount of the polycarbonate resin particles recycled to the particle-forming vessel is from 50 to 99.5% by weight of the total polycarbonate resin particles withdrawn from the particle-forming vessel.

6. A process for producing polycarbonate resin particles from a methylene chloride solution of a polycarbonate resin obtained by the polycondensation of a dihydroxydiaryl compound and phosgene, which comprises:

continuously supplying said methylene chloride solution of said polycarbonate resin and water into a preconditioning vessel under agitation conditions to form a mixture of an oil-in-water type suspension;

continuously supplying the mixture to a particle-forming vessel with the contents of the vessel being agitated;

heating the agitated mixture in the suspended state to evaporate methylene chloride, thereby forming an aqueous slurry containing polycarbonate resin particles;

subjecting at least a portion of the resulting aqueous slurry withdrawn from the particle-forming vessel, which contains the polycarbonate resin particles, to a wet pulverization treatment; and recycling at least a portion of the pulverized polycarbonate resin particles to the particle-forming vessel.

7. A process for producing polycarbonate resin particles from a methylene chloride solution of a polycarbonate resin obtained by the polycondensation of a dihydroxydiaryl compound and phosgene, which comprises:

continuously supplying said methylene chloride solution of the polycarbonate resin into a particle-forming vessel further containing an agitated aqueous medium consisting of a suspension of polycarbonate resin particles;

heating the agitated mixture while maintaining the same in a suspended state in order to evaporate methylene chloride, thereby resulting in the formation of an aqueous slurry containing polycarbonate resin particles;

subjecting at least a portion of the resulting aqueous slurry withdrawn from the particle-forming vessel, which contains the polycarbonate resin particles, to a wet pulverization treatment;

recycling at least a portion of the slurry containing the pulverized particles to the particle-forming vessel;

introducing the remainder of the aqueous slurry containing pulverized particles to an evaporation vessel; and heating said remainder of said aqueous slurry to a temperature higher than the temperature of the particle-forming vessel to complete the evaporation of methylene chloride from the polycarbonate resin particles.

8. The process of claim 1, wherein the concentration of polycarbonate resin in said methylene chloride solution ranges from 3 to 35% by weight.

9. The process of claim 1, wherein the pulverization treatment prepares polycarbonate resin particles of a size ranging from 0.1 to 4 mm.

10. The process of claim 6, wherein the volume ratio of methylene chloride solution to water in said preconditioning vessel ranges from 1:0.1–4.

11. The process of claim 10, wherein said ratio ranges from 1:0.2–3.

12. The process of claim 6, wherein the temperature within said preconditioning vessel ranges from 37° to 60° C., and the temperature within said particle-forming vessel is within the same range.

13. The process of claim 6, wherein said wet pulverization results in polycarbonate resin particles of a size ranging from 0.1 to 4 mm.

14. The process of claim 7, wherein the temperature within said evaporation vessel is within the range of 60° to 100° C.

* * * * *